Feb. 7, 1967  B. F. WARE ETAL  3,302,438
FORGING MACHINE FOR EXTRUDING AND WORKING METAL ARTICLES
Filed Oct. 18, 1963  5 Sheets-Sheet 1
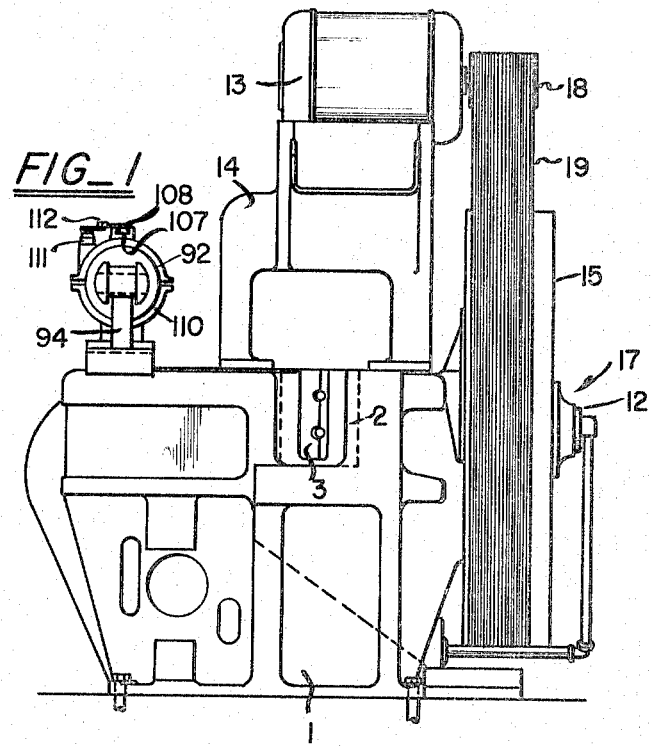
FIG_1
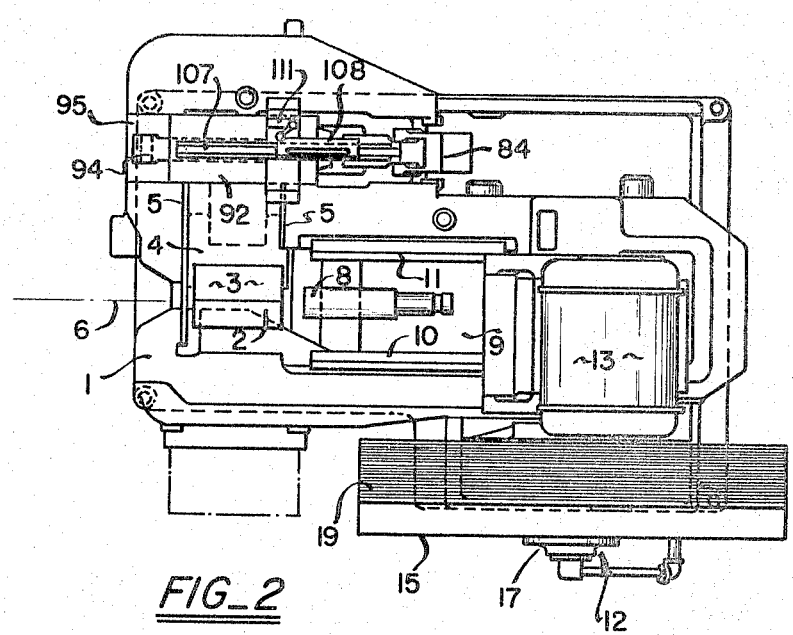
FIG_2
INVENTORS
BEN F. WARE &
PAUL W. OLIGNY
BY
Oberlin, Maky & Donnelly
ATTORNEYS

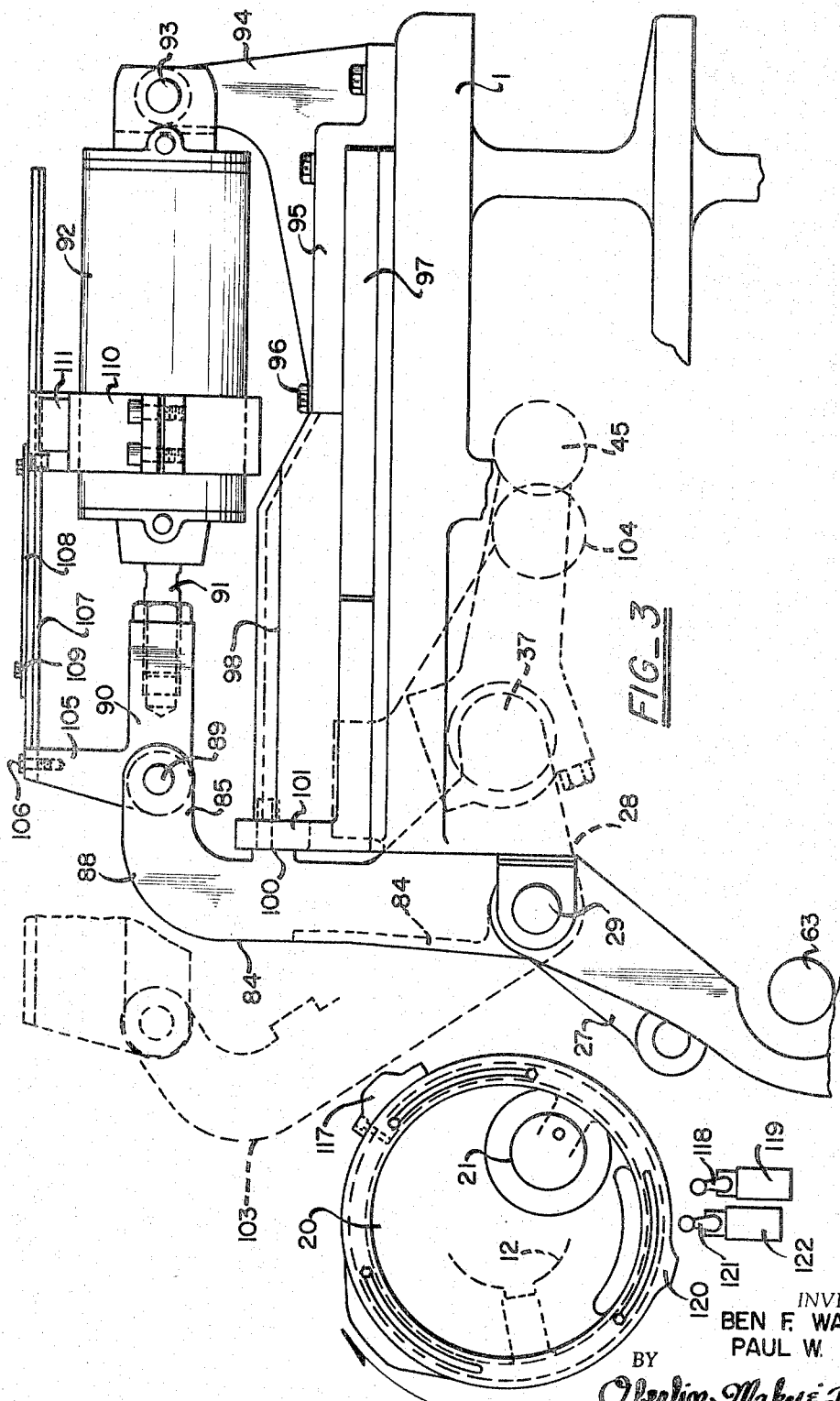

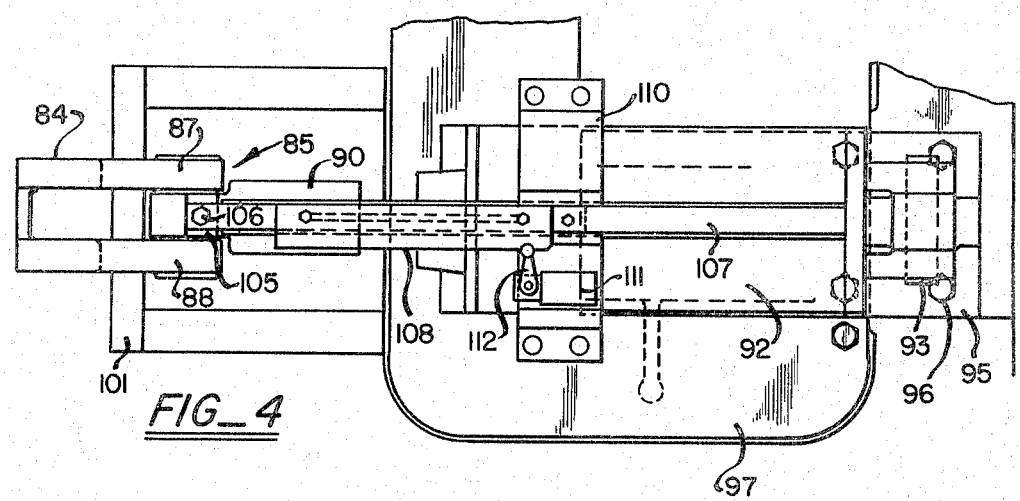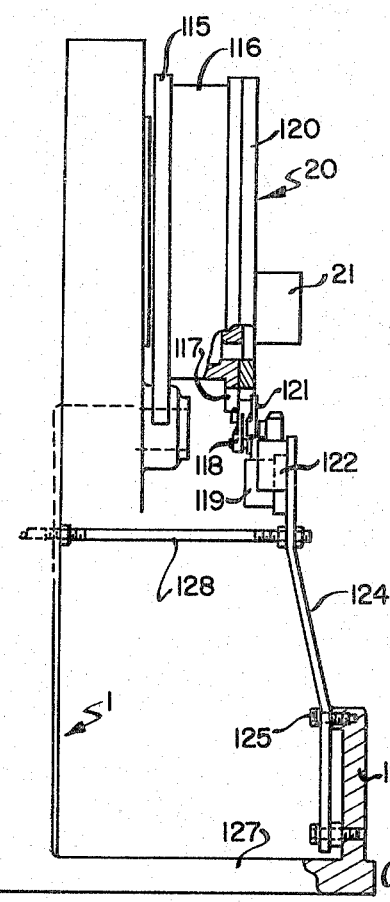

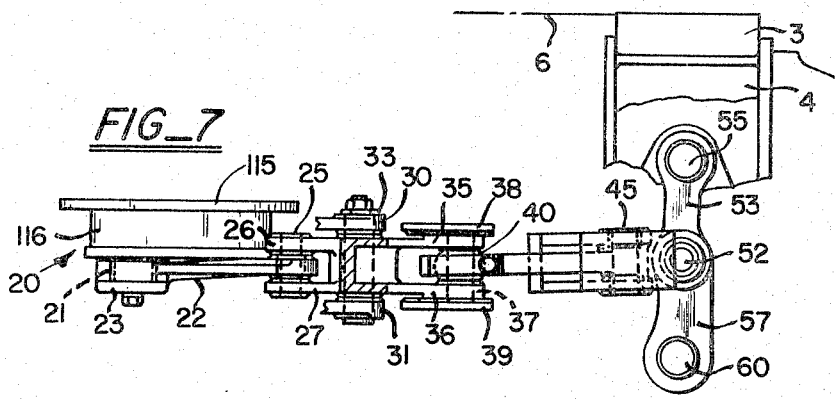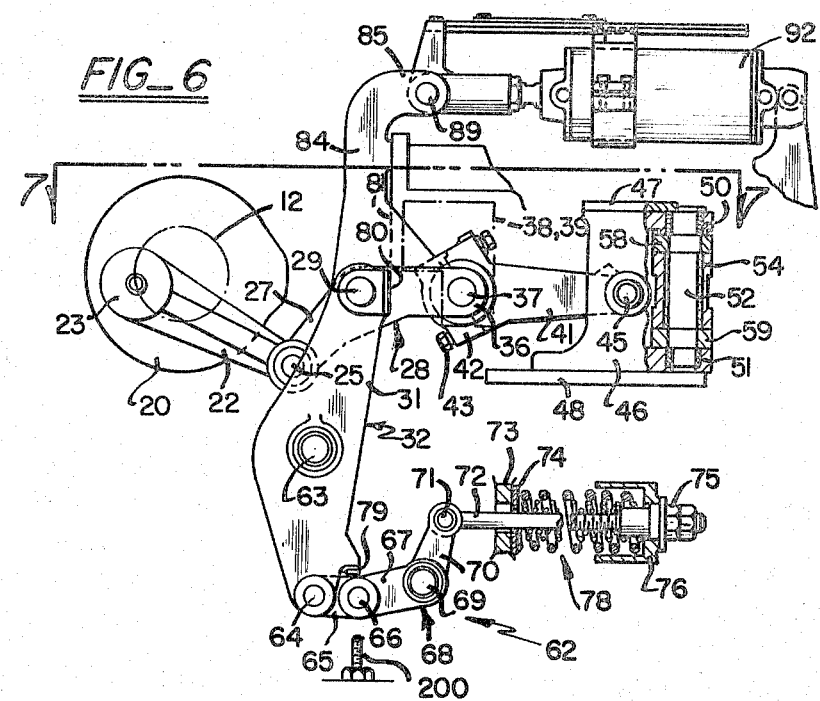

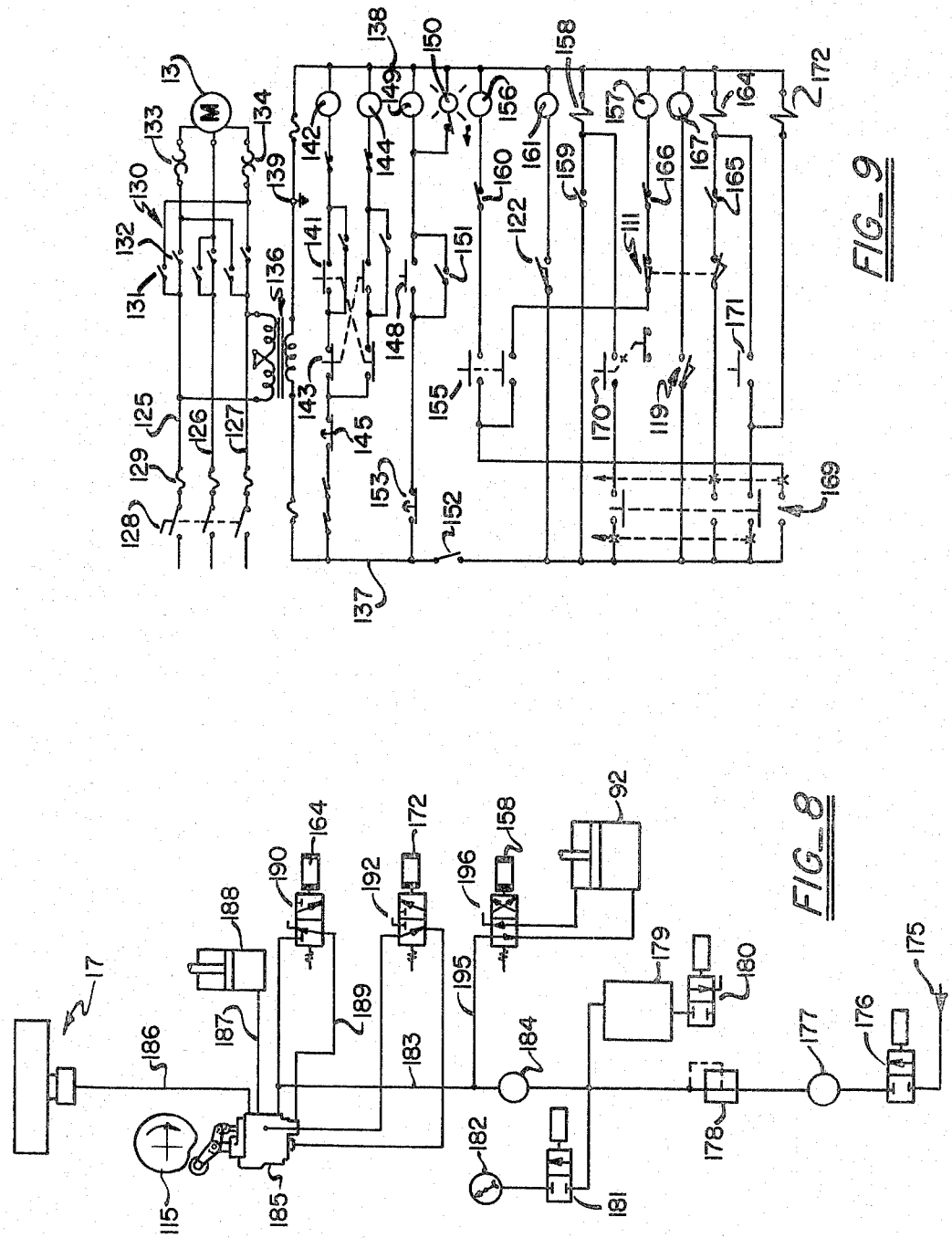

United States Patent Office 3,302,438
Patented Feb. 7, 1967

3,302,438
FORGING MACHINE FOR EXTRUDING AND WORKING METAL ARTICLES
Ben F. Ware, Euclid, and Paul W. Oligny, Wickliffe, Ohio, assignors to The Ajax Manufacturing Company, Euclid, Ohio, a corporation of Ohio
Filed Oct. 18, 1963, Ser. No. 317,185
17 Claims. (Cl. 72—315)

This invention relates as indicated to a forging machine for extruding and working metal articles and more particularly to certain improvements in forging machines of the type shown in Criley Patent No. 2,647,421, dated August 4, 1953.

In such Criley patent there is illustrated a horizontal forging machine wherein the gripping die slide is operated by a hydraulic cylinder independently of the crankshaft operated header or tool. Such machine has a timing or control mechanism so that the movement of the gripping die slide can be employed very closely to control the movement of the header slide so that the desired amount of gather and hold is precisely obtained, gather being the amount of forward movement of the header slide or tool toward the work after the gripping die slide is closed, and hold or hold-on being the amount of return movement of the header slide away from the gripping die slide before the gripping die slide releases.

However, hydraulic cylinders are necessarily slow of operation and it is always not possible to utilize the entire stroke of the machine for forming purposes, whether extruding or heading. If the entire stroke of the machine can be used for forming purposes, it is possible to utilize a smaller forging machine than would otherwise be necessary and thus considerable cost savings result. Moreover, it is possible to extrude cold and with the present invention it is not necessary to use any of the machine cycle to power the gripping die slide and the entire power of the machine may be utilized for the extruding operation.

The cold working of round stock has generally been accomplished on hydraulic machines such as that shown in the aforementioned Criley patent, but such machines are very specialized and slow of operation, not being highly adaptable for automatic feeding and continuous operation. Moreover, the machine would have to be substantially completely rebuilt to convert back to a completely mechanical operation.

It is accordingly a principal object of the present invention to provide a high speed automatic forging machine which can utilize the entire stroke for forming purposes.

A further principal object is the provision of a forging machine which can do more work more economically than heretofore possible with a given size forging machine.

A further principal object is the provision of a forging machine which will handle upsetting, extruding and combination operations which normally could not be handled in a forging machine.

A further object is the provision of a forging machine which readily can be converted to and from a mechanical operation of the gripping slide.

Yet another object is the provision of a forging machine wherein the gripping slide can be operated either by a pneumatic cylinder, from the crankshaft, or both from a pneumatic cylinder and the crankshaft.

Still another object is the provision of a forging machine having a pneumatic cylinder operated gripping die utilizing the toggle mechanical linkage normally employed when the gripping die is actuated from the crankshaft of the machine.

A still further object is the provision of a forging machine having a pneumatic cylinder operation of the gripping die which can be converted to standard mechanical operation within a minimum of time.

A yet further object is the provision of a forging machine especially suitable for extruding length of diameter shaft, rods, and similar parts where rapid, economical production and machine versatility is required.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indiative, however, of but one of the various ways in which the principle of the invention may be employed.

In said annexed drawings:

FIG. 1 is a front elevation of a forging machine in accordance with the present invention;

FIG. 2 is a top plan view of such forging machine;

FIG. 3 is an enlarged fragmentary side elevation of the mechanism employed to actuate the gripping slide;

FIG. 4 is a top plan view of such mechanism on a somewhat reduced scale;

FIG. 5 is a detail view partially broken away and in section illustrating the bracket mounting for the cam operated limit switches;

FIG. 6 is a fragmentary side elevation similar to FIG. 3 illustrating both the pneumatic cylinder and the mechanical linkage connected to the gripping slide operating mechanism;

FIG. 7 is a fragmentary horizontal section taken substantially on the line 7—7 of FIG. 6;

FIG. 8 is a schematic pneumatic circuit diagram illustrating the various operating components of the illustrated machine; and FIG. 9 is a schematic electric wiring diagram illustrating more clearly the operation of the machine of the present invention.

Referring now to the annexed drawings and more particularly to FIGS. 1 and 2, there is illustrated a horizontal forging machine in accordance with the present invention. The illustrated machine may be of the type shown in Leinweber Patent No. 2,796,616 or the aforementioned Criley patent and is a well-known type of horizontal forging machine. Such machine comprises a large casting or main frame 1 carrying a fixed gripping die 2 and opposed cooperating movable gripping die 3 mounted on a reciprocable die slide 4 mounted in guides or ways 5 extending normal or transversely of the center line 6 of the machine. Such gripping dies will ordinarily be provided with cavities as indicated in FIG. 1 which will cooperate with each other to grip a blank therebetween and when the movable gripping die has been reciprocated toward the stationary die 2 firmly to grip a workpiece therebetween, a forging tool 8 mounted on header slide 9, which is in turn reciprocably mounted in ways 10 and 11 on the frame 1, may be reciprocated axially of the blank to upset and shape the same to form, for example, diameter shafts, rods, and similar parts, or to head bolts, etc. A work transfer mechanism, not shown, may be provided to shift the blanks along a vertically extending plane from one set of vertically spaced opposed gripping die cavities to the next to perform successive forging or extrusion operations.

In conventional horizontal forging machines, the reciprocation of the gripping die slide 4 and thus the gripping die 3 may be obtained from the main crankshaft 12 of the machine which is powered by an electric motor 13 mounted on upstanding frame 14 which is operative to drive a large flywheel 15 provided with an air operated clutch and brake unit shown generally at 17. The motor 13 may be provided with a drive pulley 18 having a plurality of belts 19 trained thereabout as well as the flywheel 15.

Referring now additionally to FIGS. 6 and 7, it will be seen that the gripping die slide 4 is normally actuated from the crankshaft 12 through the dual toggle operating linkage shown in FIGS. 6 and 7. An eccentric 20 may be mounted on the crankshaft 12 and includes an eccentric pin 21 projecting from the side thereof on which is mounted on a suitable bushing one end of eccentric side arm 22 held in place by a retainer washer 23. The opposite end of the side arm 22 is mounted on a side arm pin 25 through a suitable bushing, such pin 25 extending between projecting arms 26 and 27 of bell crank knuckle 28. The center of the bell crank knuckle is mounted on bell crank knuckle pin 29 through a suitable bushing which extends between the arms 30 and 31 of relief fulcrum lever 32 and is held in place by a knuckle pin washer 33.

The bell crank knuckle 28 includes two parallel projecting arms 35 and 36 between which extends a cross-head link pin 37. Bell crank liners 38 and 39 are provided on each side closely confining and guiding the movement of the knuckle 28. A ball bushing 40 is mounted on the cross-head link pin 37 between the arms 35 and 36 of the bell crank knuckle and one end of cross-head link 41 is secured on such ball bushing by removable cap 42 held to the end of the link by fasteners indicated at 43. The opposite end of the link 41 is connected by pin 45 to cross-head 46 mounted for sliding movement between cross-head top liner 47 and guide liner 48 mounted in the frame 1. The cross-head 46 is connected top and bottom through bushings 50 and 51 to a knuckle pin 52. One end of die slide link 53 is also mounted on the knuckle pin 52 through bushing 54 with the opposite end being mounted on die slide pin 55 connected to the die slide 4. Bed plate knuckle 57 is bifurcated and connected at 58 and 59 to the knuckle pin 52 at one end and to bed plate pin 60 at the opposite end. The bed plate pin 60 is fixed in the frame 1 while the die slide pin 55 is mounted on the die slide and movement of the knuckle pin 52 caused by movement of the cross-head 46 will cause the die slide pin 55 to move toward and away from the bed plate pin 60. A toggle linkage for opening and closing the gripping die is thus provided by the three pins 52, 55 and 60. It will also be seen that a further toggle linkage is provided by the pins 29, 37 and 45. Thus the die slide operating mechanism has a dual toggle and the toggle provided by the pins 52, 55 and 60 may go slightly past center locking the gripping die 3 in work gripping position while the toggle formed by the pins 29, 37 and 45 may approach an in line or locking position but need not obtain an over-center locking condition. The die slide operating mechanism is shown in FIGS. 6 and 7 in a die closed position and it will readily be appreciated that as the eccentric 20 rotates, the bell crank knuckle 27 will be oscillated opening and closing the gripping die. Initially, the bell crank knuckle 27 will pivot in a counterclockwise direction as viewed in FIG. 6 causing the pin 37 to move upwardly about the bell crank knuckle pin 29 pulling the cross-head rearwardly breaking the toggle formed by the links 53 and 57 pulling the pin 55 downwardly as viewed in FIG. 7 retracting the die slide and thus the gripping die 3. To close the gripping die continued rotation of the eccentric 20 will cause the bell crank knuckle 28 to rotate about the knuckle pin 29 in a clockwise direction as viewed in FIG. 6 moving the pin 37 to a substantially in line position between the pins 29 and 45 moving the cross-head 46 outwardly and thus moving the pins 55, 52 and 60 into an in line position with the gripping die 3 now closed.

In such standard operating linkage, a safety mechanism indicated generally at 62 is employed to protect the guides should a workpiece be improperly positioned therebetween. Such safety mechanism comprises intermediate pivotal mountings of the relief fulcrum lever 32 on pin 63 secured to the bed frame. The lower end of the lever 32 is provided with a relief fulcrum lever pin 64 to which is connected a link 65 which is also connected to relief bell crank pin 66 in turn connected to one arm 67 of relief bell crank 68. Such bell crank is mounted on fixed pin 69 and includes a further arm 70 pivoted at 71 to rod 72. Such rod extends freely through a fixed bracket 73 and a spring washer 74 and the end of such rod is threaded and provided with an adjusting nut 75 retaining a spring adjusting cup 76 thereon. Three compression springs shown generally at 78 extend between the adjusting cup 76 and the washer 74 and tend strongly to bias or urge the spring rod 72 to the right as seen in FIG. 6. This causes the bell crank 68 to tend to pivot about its pin 69 in a clockwise direction as seen in such figure. Movement of the bell crank is limited by physical engagement between the arm 67 of the bell crank and bumper plate 79 on the relief fulcrum lever 32. The upper end of the relief fulcrum lever 32 is provided with top bumping plates 80 which engage vertical surface 81 of the bed frame 1. The springs 78 biasing the bell crank 68 in a clockwise direction as viewed in FIG. 6 will then tend to move the pivots 64, 66 and 69 into an in line position moving or holding the relief fulcrum lever 32 with the bumper plate 80 in engagement with the surface 81, such movement also being limited by the bumper plate 79. However, should the gripping die close upon a workpiece improperly positioned, the pivot 29 of the bell crank knuckle may give rearwardly or the left as seen in FIG. 6 causing the pin or pivot 64 to move to the right pivoting the bell crank 68 in a counterclockwise direction compressing the springs 78. In this manner a safety relief mechanism is provided.

The improvements of the present invention comprise a relatively simple modification of the bell crank knuckle 28 which includes the addition of a vertically extending arm 84 having a top offset or angled portion 85 as seen more clearly in FIGS. 3 and 6. Such arm is bifurcated or split and includes a vertically extending web 86 therebetween for a portion of the height thereof providing a more or less channel sectional shape (see FIG. 7). Between the upper laterally offset end portions 87 and 88 of the arm 84, there is provided a cylinder rod eye pin 89 pivotally connecting to the top of such arm L-shape member 90 which is connected to rod 91 of pneumatic piston-cylinder assembly 92. The blind end of the piston-cylinder assembly 92 is pivotally mounted at 93 to the top of bracket 94 which includes a base portion 95 secured by fasteners 96 to the top of the frame 1. Such base portion includes a vertically offset portion extending over die slide cover plate 97 and the end of such offset portion abuts against cover plate 98.

The laterally spaced portions 87 and 88 of the arm 84 are each provided with projections 100 which engage the end 101 of the cover plate 98 when the piston-cylinder assembly 92 is fully retracted. Such piston-cylinder assembly may, for example, be a pneumatic double-acting air motor cushioned at both ends having an eight inch bore and a thirteen inch stroke with a one and three quater inch rod 91 projecting therefrom.

Accordingly, it can now be seen that the motion of the bell crank knuckle 28 obtained by the link 22 and the eccentric 20 may be imparted by extension and retraction of the piston-cylinder assembly 92 with such link 22 disconnected. Extension of the piston-cylinder assembly 92 will cause the arm 84 to move to the phantom line position indicated at 103 in FIG. 3 retracting the cross-head pin 45 to the position indicated at 104. In this position, the griping die will be open and when the piston-cylinder assembly 92 is retracted, with the projections 100 engaging the end 101 of the cover plate 98, the cross-head will be moved forwardly closing the gripping die.

Secured to the upwardly projecting arm 105 of the L-shape member 90 by a suitable fastener indicated at 106 is a cam slide 107 having plate cam 108 secured thereto by fasteners 109. The cam slide 107 extends through gibs in cam slide guide 110 which may be clamped about the piston-cylinder assembly 92. The annular guide 110 includes a mounting for limit switch 111 having a follower arm 112 adapted to engage the cam 108 as the cam slide reciprocates back and forth with the piston rod 91.

Referring now additionally to FIG. 5 in conjunction with FIGS. 3 and 7, the eccentric 20 may be employed for a number of purposes. Such eccentric includes a cam 115 which may be employed to operate an air pilot timer valve, hereinafter described, a brake drum 116 for an air cylinder operated band type brake, a cam 117 operative to trip follower arm 118 of limit switch 119 and a cam 120 secured to the face of the eccentric operative to trip follower arm 121 of limit switch 122. Such limit switches may be mounted on upstanding bracket arm 124 secured by fasteners 125 to the inside of ridge 126 of the base 127 of the frame 1. A support rod 128 extends between the bracket arm 124 and the wall of the base to rigidify and support the limit switches in the proper position. The cams 117 and 120 may be readily adjusted circumferentially of the eccentric drum 20 and will, of course, function to detect a particular rotative position of the crankshaft 12.

Referring now to the schematic diagrams of FIGS. 8 and 9 and more particularly to FIG. 9, a 440-volt, 3-phase, 60-cycle current may be supplied to the motor 13 through lines 125, 126 and 127 with a disconnect switch 128 and suitable fuses 129 being provided therein. A forward and reverse circuit indicated generally at 130 is provided for the motor 13 which may be a 10 H.P., 720 r.p.m. motor. Relay operated reverse switches 131 and relay operated forward switches 132 are vertically aligned and provided within such circuit 130. Overload switches 133 and 134 are also provided for the motor 13.

A transformer 136 is connected to the lines 125 and 127 and provides control power to control circuit mains 137 and 138 through suitable fuses indicated with the line 138 being connected to ground at 139. A manually operated motor forward switch 141 energizes motor forward relay 142 and similarly a motor reverse switch 143 energizes motor reverse relay 144. Suitable latching and holding circuits are provided as indicated for the proper switching to power the motor 13 in either a forward or reverse direction. A motor stop push button 145 is also provided in series with both the relays 142 and 144.

The main control circuit is energized by a push button power on switch 148 which energizes relay 149 and power on signal light 150, such relay closing holding switch 151 and switch 152 in control main 137. An emergency stop push button 153 is also provided in series with the relay 149 and may be pushed to open circuit such relay. With the push button 148 actuated, the control circuit is now prepared for operation.

A manual push button 155 of the momentary contact type energizes relays 156 and 157 which are latching relays. The relay 156 energizes solenoid 158 by closing switch 159. Such relay 156 also opens normally closed switch 160 to prevent pulsing thereof. Relay 161 operated by the cam operated limit switch 122 unlatches the relay 156.

Relay 157 is a latch relay which energizes solenoid 164 by closing switch 165, such solenoid releasing the brake and energizing the clutch. Relay 157 also opens normally closed switch 166 to prevent pulsing of such relay and relay 167 operated by limit switch 119 unlatches the relay 157.

A selector switch 169, normally in a run condition, may be employed to obtain an inch condition for manual and automatic operation. When the machine is initially set up, the inching operation will be employed properly to set the various components of the machine. Push button 170, which is a held contact push button, may be employed manually to energize and deenergize solenoid 158. Push button 171, of the momentary contact type, may be employed manually to energize and deenergize solenoid 164. A solenoid 172 may be employed to place the timer on inch.

Referring now to FIG. 8, a source of shop air line pressure 175 and a two way manually operated valve 176 may selectively supply air pressure therefrom through filter 177, through regulator 178, to air storage tank 179. A manually operated two way valve 180 may be employed to drain such tank 179. A manually operated two way valve 181 also connects such source of air to a gauge 182. A main pressure line 183 is provided with an oil fog lubricator 184 and is connected to timer valve 185 which may be of the general type illustrated in Elliot Patent 2,850,132 assigned to The Ajax Manfacturing Company of Euclid, Ohio. From such timer valve, air lines 186 and 187 are connected to the clutch unit 17 through a rotary air connection and to brake cylinder 188. A pilot line 189 operated by four way valve 190 in turn operated by brake off and clutch on solenoid 164 may be employed to shift the valve 185 thus to actuate the clutch and brake. Valve 192 operated by solenoid 172 may be employed to place the timer on an inch condition. Branch 195 leading from the main pressure line 183 passes through four way valve 196 operated by solenoid 158 to extend and retract the pneumatic piston-cylinder assembly 92 which functions to open and close the gripping die.

*Operation*

With the electrical power on and the motor energized to rotate in the forward direction through the energization of relay 142 and with shut off valve 176 open, valves 180 and 181 being closed, the selector switch 169 is placed in a run condition and the air supply is turned on. The machine is now in a starting condition and the operator will push the power on push button 148 which energizes relay 149 which is turn energizes the control circuit and holds around the push button 148. The operator now pushes push button 155 energizing relay 156 as well as relay 157. Relay 156 closes energizing solenoid 158 which shifts valve 196 reversing the air to the die slide cylinder 92 retracting the arm 84 from the phantom line position 103 seen in FIG. 3 and rocking the bell crank knuckle 28 is a clockwise direction about its pivot 29 to close the die slide 3 through the double toggle linkage illustrated in FIGS. 6 and 7.

The die slide, on closing, moves the slide 107 to the right as seen in FIG. 3 tripping limit switch 111 energizing solenoid 164 which shifts valve 190 actuating valve 185 energizing the clutch and brake assembly of the machine to cause now the header slide to move forward. Such forward movement of the header slide caused by rotation of the crankshaft 12 trips limit switch 119 resetting relay 157 by energizing the unlatching relay 167. The header slide 9 now moves forward and the forging tool 8 will engage the work held by the gripping dies. The header slide on return trips limit switch 122 resetting relay 156 by energizing the unlatching relay 161. The timer cam 115 for the valve 185 will function to shut off the air to the clutch 17 and set the brake by energization of the brake cylinder 188 at the end of the cycle. It will be appreciated that the tripping of the limit switch 122 by the rotating cam 120 which unlatches the relay 156 will deenergize the solenoid 158 by opening switch 159 permitting the valve 196 to spring-return to its FIG. 8 position supplying pressure from the line 195 to the blind end of the piston-cylinder assembly 92 causing the rod 91 to extend moving the arm 84 to the phantom line position in FIG. 3 opening the die slide. Accordingly, by adjustment of the cam 108, the position of the die slide at which the header slide will start forward can closely be controlled. In this manner, the amount of gather can be precisely regulated. By adjusting the cam 120, the position of the header slide at which the piston-cylinder assembly 92 will be caused to extend opening the gripping slide can also precisely be controlled. Thus the hold on can be closely regulated. In any event, the entire mechanical cycle of the machine through a complete revolution of the crankshaft 12 may be employed to drive and retract the heading or forging tool 8.

In order to inch the header slide, the selector switch 169 will be placed on inch position and push button 171 may then be employed to energize the solenoid 164 manually and the solenoid 154 will shift spring return valve 190 releasing the brake and operating the clutch to move the header slide. When the push button 171 is released, the valve 190 will return and the valve 185 will exhaust air operated clutch and set the brake.

For manual movement of the die slide, the selector switch 169 will be placed in an inch position and the operator may push manual button 170, which is a held contact push button, which energizes and deenergizes solenoid 158. This will shift the valve 196 reversing the air supply to the die slide cylinder 92, closing the dies. When the operator pushes the die slide open button of the switch 170, solenoid 158 is deenergized, reversing the air to the die slide cylinder, opening the dies.

The start of the operation of the die slide is, of course, completely independent of the operation of the header slide. The gripping die may thus be closed completely before the header slide starts forward or may be actuated to close completely when the header slide is approximately 32.4% forward. The die slide may return when the tools in the header slide are clear of the forging or when the header slide is fully back. The limit switch 122 may be adjusted through approximately 150° of arc and functions to return the die slide by deenergizing the solenoid 158 simultaneously resetting the relay 156 to starting condition. The limit switch 111 may also be adjusted along the cam slide 107 and at one extreme it permits the die slide to close fully before the header slide moves while at the other extreme allows the die slide to close when the header slide has moved approximately ⅓ of its forward travel.

Referring now to FIG. 6, since the pneumatic piston-cylinder assembly 92 will itself act as a safety mechanism precluding die damage should a workpiece be improperly positioned between the gripping dies due to the somewhat resilient nature of the air within the cylinder, an adjustable screw 200 may be mounted on the machine beneath the pivot pin 66 at the end of the bell crank 68 to block up the pivot 66 to render the safety mechanism 62 inoperative.

In order to change over from the air operated die slide to a conventional mechanical operation, with the selector switch 169 in inch position, the operator may energize push button 170 causing the dies to close and remain closed until the push button 170 is again operated. The air cylinder rod eye pin 89 may now be removed and the eccentric side arm 22 as well as the washer 23 may now be replaced. Push button 171 may be energized inching the eccentric shaft 12 around until the side arm pin 25 can be engaged with the arms 26 and 27 of the bell crank knuckle 28. The push button 170 is again actuated and the selector switch 169 may be returned to the run position. The push button 155 may then energize the solenoid 164 and the operation of the solenoid 158 may be removed from the circuit. When the die slide is operated by the pneumatic piston-cylinder assembly 92, the eccentric side arm 22 will normally be removed. However, it will be appreciated that the eccentric side arm may be left in place and the pneumatic piston-cylinder assembly 92 may be operated in conjunction with the mechanical opening and closing of the die slide thus permitting the machine to utilize its full power for the heading or forging operation.

It can now be seen that the pneuamtic piston-cylinder assembly 92 which is mounted on the top of the die slide cover may be employed to operate the die slide utilizing the double toggle operating linkage thereof by providing a vertically extending arm on the bell crank knuckle 28. In this manner, the pneumatic piston-cylinder assembly 92 does not interfere with the operating linkage for the die slide should such be operated mechanically through the eccentric sidearm. Accordingly, a conventional forging machine with very minor modifications can be converted whereby the die slide will be operated pneumatically, whereby it may be operated conventionally from the crankshaft 12, or whereby it may be operated both mechanically and pneumatically. Such pneumatic cylinder operation of the die slide greatly increases the forging capacities of the machine in that the extent of gather and hold can closely be controlled and the single rotation of the crankshaft can be employed solely for the forging operation. When the pneumatic cylinder is employed for die slide operation, the mechanical safety linkage 62 need not be employed since the air cylinder functions under grip overload as an air spring. With the pneumatic cylinder operation of the die slide, a greater variety of stock, from solid to tubing can be gripped by the dies without distortion since gripping pressure is readily controlled by varying the pressure of the supply air which is obtained from a readily available source and does not require any of the work provided by motor 13. Moreover, with the pneumatic cylinder, grip time can readily be held to a minimum and for hot forging operations, the die life is related to the length of grip time and if gripping can be held to a minimum, die life will greatly be increased.

Other modes of applying the principle of the invention may be employed, change being made as regards the details described, provided the features stated in any of the following claims or the equivalent of such be employed.

We, therefore, particularly point out and distinctly claim as our invention:

1. In a forging machine having a frame, a stationary griping die, a movable gripping die mounted on a die slide, means mounting said die slide for horizontal reciprocation in said frame to move said movable gripping die into and out of cooperative work gripping relationship to said stationary die, a third die reciprocable in said frame in a direction normal to the movement of said movable gripping die to engage and upset a workpiece thus gripped by said gripping dies, a first toggle linkage interconnecting said die slide and said frame, a second toggle linkage connected to said first toggle linkage and including a bell crank knuckle, a vertically extending arm on said bell crank knuckle, a die slide cover plate, a piston-cylinder assembly mounted on said die slide cover plate and connected to said arm, and means operative to extend and retract said piston-cylinder assembly to move said movable gripping die.

2. A forging machine as set forth in claim 1 including means responsive to the position of said arm to cause said third die to move toward said gripping dies.

3. A forging machine as set forth in claim 2 including means responsive to the position of said third die to energize said piston-cylinder assembly to move said movable die away from said stationary die.

4. A forging machine as set forth in claim 1 including a mechanical drive for said third die, and means optionally to connect said bell crank knuckle to said mechanical drive or to said piston-cylinder assembly.

5. A forging machine as set forth in claim 4 wherein said mechanical drive includes an eccentric, and removable link means operative to connect said eccentric with said bell crank knuckle to open and close said gripping dies from said mechanical drive.

6. In an upsetting forging machine having a stationary gripping die, a horizontally reciprocable gripping die adapted to be reciprocated into and out of cooperative work gripping relationship to said stationary die, and a third die horizontally reciprocable in a direction normal to such reciprocation of said reciprocable gripping die to engage and upset an end portion of a workpiece thus gripped by such gripping dies, a first toggle linkage connected to said reciprocable gripping die, a second toggle linkage connected to said first toggle linkage and including a bell crank knuckle, a vertically extending arm on said bell crank knuckle, a die slide cover plate, a pneumatic piston-cylinder assembly mounted on said cover plate and connected to said arm, and means operative to extend and retract said piston-cylinder assembly to reciprocate said reciprocable gripping die.

7. In a horizontal forging machine including gripping dies and a header die, a mechanical drive for said gripping and header dies, a pneumatic piston-cylinder assembly, a drive linkage for opening and closing said gripping dies, and means optionally to connect said drive linkage to said mechanical drive or to said pneumatic piston-cylinder assembly.

8. A forging machine as set forth in claim 7 wherein said drive linkage includes a first toggle linkage, a second toggle linkage operative to open and close said first toggle linkage and including a bell crank knuckle, a first arm on said knuckle, means releasably to connect said first arm to said mechanical drive, a second arm on said knuckle, and means releasably to connect said second arm to said piston-cylinder assembly.

9. A forging machine as set forth in claim 8 wherein said second arm extends vertically and said pneumatic piston-cylinder assembly is mounted above said first and second toggle linkages.

10. A forging machine as set forth in claim 9 including means operative to retract said pneumatic piston-cylinder assembly when connected to said bell crank knuckle to close said gripping dies.

11. A forging machine as set forth in claim 10 including a cam slide connected to the rod of said pneumatic piston-cylinder assembly for movement therewith, and means responsive to the position of said cam slide operative to energize said mechanical drive.

12. A forging machine as set forth in claim 11 including means responsive to the position of said header die operative to extend said pneumatic piston-cylinder assembly to open said gripping dies.

13. A forging machine as set forth in claim 12 wherein said mechanical drive includes an eccentric, and removable link means adapted to connect said eccentric and said first arm of said knuckle.

14. A forging machine as set forth in claim 13 including first and second cam means on said eccentric, said first cam means being operative to extend said pneumatic piston-cylinder assembly to open said gripping dies, and said second cam means being operative to reset the means to energize said mechanical drive.

15. In a forging machine as set forth in claim 8 including a relief lever supporting said bell crank knuckle for pivotal movement, a safety linkage connected to said relief lever, and means to render said safety linkage inoperative when said bell crank knuckle is connected to said pneumatic piston-cylinder assembly.

16. In a horizontal forging machine having a stationary gripping die, a horizontal reciprocable gripping die adapted to be reciprocated into and out of cooperative work gripping relationship to said stationary die, and a third die reciprocable in a direction normal to such reciprocation of said reciprocable gripping die to engage and upset and end portion of an elongated cylindrical workpiece thus gripped by said gripping dies; a drive linkage for opening and closing said gripping dies, a cover plate for said drive linkage, a pneumatic piston-cylinder assembly mounted on said cover plate above said drive linkage, and a vertically extending rocker arm pivotally connecting at its upper end, said pneumatic piston-cylinder assembly and said drive linkage at its other end operative to open and close said gripping dies.

17. A forging machine as set forth in claim 16 including means responsive to the closing of said gripping dies to energize said third die, and means responsive to the position of said third die to open said gripping dies.

References Cited by the Examiner
UNITED STATES PATENTS

| | | | |
|---|---|---|---|
| 1,975,537 | 10/1934 | Criley | 10—16 |
| 2,121,119 | 6/1938 | Criley | 10—16 |
| 2,343,403 | 3/1944 | Criley | 10—16 |
| 2,647,421 | 8/1953 | Criley | 72—23 |
| 2,759,379 | 8/1956 | Brandt | 10—16 |
| 2,796,616 | 6/1957 | Leinweber | 10—12 |

CHARLES W. LANHAM, *Primary Examiner.*

G. P. CROSBY, *Assistant Examiner.*